(12) United States Patent
Liu et al.

(10) Patent No.: US 11,495,913 B2
(45) Date of Patent: Nov. 8, 2022

(54) OPTICAL FIBER CONNECTOR AND OPTICAL FIBER CONNECTOR ASSEMBLY

(71) Applicant: CommScope Technologies LLC, Hickory, NC (US)

(72) Inventors: Jin Liu, Jiangsu (CN); Hongjuan An, Jiangsu (CN); Mulan Huang, Jiangsu (CN); Yujun Zhang, Jiangsu (CN)

(73) Assignee: CommScope Technologies LLC, Hickory, NC (US)

(*) Notice: Subject to any disclaimer, the term of this patent is extended or adjusted under 35 U.S.C. 154(b) by 213 days.

(21) Appl. No.: 16/916,676

(22) Filed: Jun. 30, 2020

(65) Prior Publication Data
US 2021/0021082 A1    Jan. 21, 2021

(30) Foreign Application Priority Data

Jul. 16, 2019 (CN) .......................... 201910638058.1

(51) Int. Cl.
*G02B 6/38* (2006.01)
*H01R 13/627* (2006.01)
*H01R 24/40* (2011.01)

(52) U.S. Cl.
CPC ....... *H01R 13/6277* (2013.01); *G02B 6/3825* (2013.01); *G02B 6/3894* (2013.01); *H01R 24/40* (2013.01)

(58) Field of Classification Search
CPC .. G02B 6/3825; G02B 6/3894; G02B 6/3888; G02B 6/3897; G02B 6/3878; G02B 6/38; H01R 13/6277
See application file for complete search history.

(56) References Cited

U.S. PATENT DOCUMENTS

| 6,645,011 B2 | 11/2003 | Schneider et al. |
| 6,692,286 B1 | 2/2004 | De Cet |
| 6,702,289 B1 | 3/2004 | Feola |
| 8,496,495 B2 | 7/2013 | Kari |

(Continued)

FOREIGN PATENT DOCUMENTS

KR        101330648 B1     11/2013

OTHER PUBLICATIONS

"International Preliminary Report on Patentability corresponding to International Application No. PCT/US2020/040217 dated Jan. 27, 2022".

(Continued)

*Primary Examiner* — Jennifer Doan
(74) *Attorney, Agent, or Firm* — Myers Bigel, P.A.

(57) ABSTRACT

An optical fiber connector includes: a cylindrical connector body; an optical fiber connection assembly disposed within the connector body proximate to a proximal end of the connector body, the optical fiber connection assembly including a support and at least one elongate member fixed to and extending through the support, the elongate member being configured to couple an optical fiber of an optical fiber cable; a locking assembly for holding the optical fiber cable, the locking assembly being disposed proximate to a distal end of the optical fiber connection assembly; and a sealing element disposed at a distal end of the optical fiber connector, the sealing element being configured to seal the connection between the distal end of the optical fiber connector and an outer periphery of the optical fiber cable.

17 Claims, 5 Drawing Sheets

100

(56) References Cited

U.S. PATENT DOCUMENTS

| | | | | |
|---|---|---|---|---|
| 8,864,389 B2 * | 10/2014 | Lin | ...................... | G02B 6/3897 |
| | | | | 385/60 |
| 9,304,262 B2 * | 4/2016 | Lu | ........................ | G02B 6/4403 |
| 10,371,900 B2 * | 8/2019 | Kluwe | ................... | G02B 6/387 |
| 2017/0285275 A1 | 10/2017 | Hill et al. | | |
| 2018/0052288 A1 | 2/2018 | Thompson et al. | | |
| 2018/0259721 A1 | 9/2018 | Bund et al. | | |
| 2019/0179090 A1 | 6/2019 | Zseng | | |

OTHER PUBLICATIONS

International Search Report and Written Opinion corresponding to International Application No. PCT/US2020/040217 dated Oct. 22, 2020.

* cited by examiner

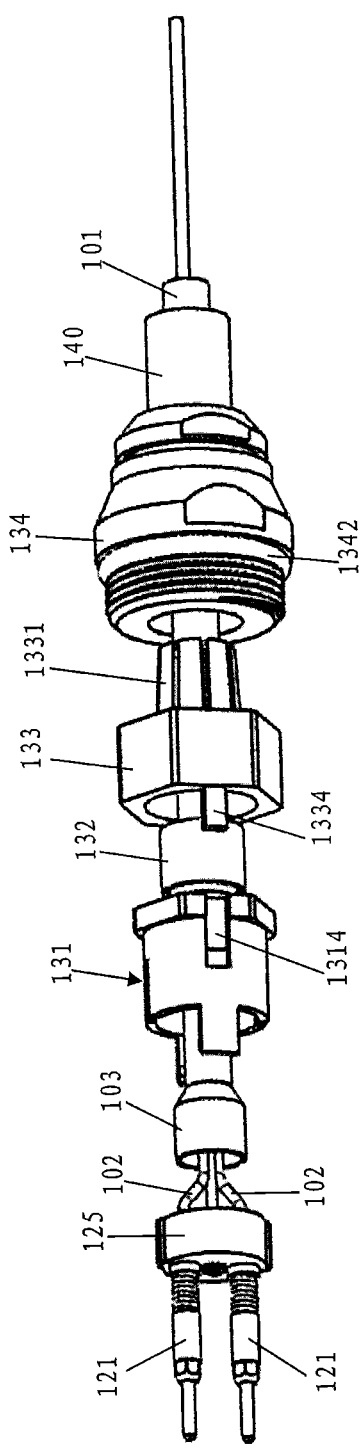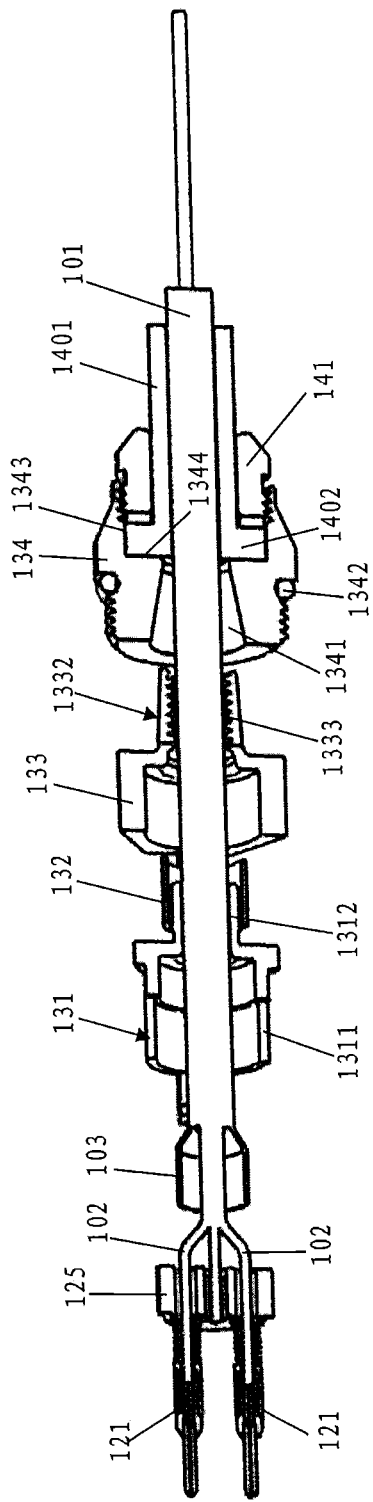
Fig. 2
Fig. 3

OPTICAL FIBER CONNECTOR AND OPTICAL FIBER CONNECTOR ASSEMBLY

RELATED APPLICATION

The present application claims priority from and the benefit of Chinese Patent Application No. 201910638058.1, filed Jul. 16, 2019, the disclosure of which is hereby incorporated herein by reference in full.

FIELD OF THE INVENTION

The present disclosure relates generally to cable connectors. More particularly, the present disclosure relates to optical fiber connectors adapted to be used outdoors and optical fiber connector assemblies including the same.

DESCRIPTION OF THE INVENTION

Optical fiber cables are increasingly used to transmit information. A large amount of information is converted into optical signals and then transmitted via optical fiber cables. An optical fiber cable typically includes one or more optical fibers, Kevlar fibers surrounding the optical fibers and/or filled in between the optical fibers, and a jacket surrounding the optical fibers and the Kevlar fibers.

Optical fiber connectors are provided to connect optical fiber cables. Within the connectors, the cables are coupled such that optical fibers in each cable are aligned with one another, so as to allow the transmission of signals therebetween.

Most existing optical fiber connectors cannot be used outdoors. When used outdoors, existing connectors are susceptible to environmental factors (such as water, moisture, smoke, dust, etc.), which may severely impair the transmission performance of optical fibers. For example, standard SC-type optical fiber connectors or LC-type optical fiber connectors are not adequately protected against fluid ingress or other outdoor environmental factors, and thus can only be used indoors.

At present, there is an urgent demand for optical fiber connectors capable of being used outdoors. In particular, optical fiber connectors that can be used outdoors are critical to fiber-to-the-antenna (FTTA) interconnect network solutions.

SUMMARY OF THE INVENTION

An object of the present disclosure is to provide an optical fiber connector that can be used outdoors and an optical fiber connector assembly that includes the same. With the optical fiber connector and optical fiber connector assembly according to the present disclosure, one or more of problems existing in the prior art can be solved, and other additional advantages can be achieved.

According to a first aspect of the present disclosure, an optical fiber connector is provided. The optical fiber connector may comprise: a cylindrical connector body; an optical fiber connection assembly disposed within the connector body proximate to a proximal end of the connector body, the optical fiber connection assembly including a support and at least one elongate member fixed to and extending through the support, the elongate member being configured to engage an optical fiber in an optical fiber cable; a locking assembly for holding the optical fiber cable, the locking assembly being disposed proximate to a distal end of the optical fiber connection assembly; and a sealing element disposed at a distal end of the optical fiber connector, the sealing element being configured to seal a connection between the distal end of the optical fiber connector and an outer periphery of the optical fiber cable.

According to an embodiment of the present disclosure, the sealing element may include a cylindrical sealing element body and a flange disposed at a proximal end of the sealing element body.

According to an embodiment of the present disclosure, the locking assembly may include a first locking mechanism for crimping at least a jacket of the optical fiber cable and a second locking mechanism for gripping the optical fiber cable.

According to an embodiment of the present disclosure, the first locking mechanism may include a support member and a crimping member. An outside surface of the support member is configured to engage at least the jacket of the optical fiber cable, and the crimping member is configured to crimp the jacket between the support member and the crimping member.

According to an embodiment of the present disclosure, the second locking mechanism may include a gripping member and a tightening member for tightening the gripping member. The gripping member may include a gripping portion formed of a plurality of resilient fingers distributed along a circumferential direction, and the plurality of resilient fingers are capable of being deformed radially inwardly by the tightening member so as to grip the optical fiber cable extending therethrough.

According to an embodiment of the present disclosure, inner surfaces of the resilient fingers may include protrusions.

According to an embodiment of the present disclosure, a proximal portion of the tightening member may define a lumen for receiving the gripping portion of the gripping member, and both the gripping portion of the gripping member and the lumen of the tightening member are tapered from a proximal end towards a distal end.

According to an embodiment of the present disclosure, a distal portion of the tightening member may define a second lumen, and at least a portion of the sealing element extends into the second lumen.

According to an embodiment of the present disclosure, the tightening member may be connectable with the connector body in a threaded connection.

According to an embodiment of the present disclosure, a second sealing element surrounds the tightening member for sealing a connection interface between the tightening member and the connector body.

According to an embodiment of the present disclosure, the second sealing element may be an O-ring.

According to an embodiment of the present disclosure, the optical fiber connection assembly may include a plurality of elongate members, and the optical fiber connector may include a separation element disposed between the optical fiber connection assembly and the locking assembly.

According to an embodiment of the present disclosure, the optical fiber connector may include a push-pull connection mechanism. The push-pull connection mechanism may include: a cylindrical connection mechanism body arranged coaxially with the connector body and radially spaced apart from an outer surface of the connector body by a distance to form an annular gap between the connection mechanism body and the connector body; a coupling sleeve at least partially covering the connection mechanism body; an annular slide block positioned in the annular gap; a first biasing member biasing the annular slide block toward the proximal end of the optical fiber connector; a second biasing member biasing the coupling sleeve toward the proximal end of the optical fiber connector; at least one retaining member, each of which being respectively positioned in a respective pocket of the connection mechanism body and being capable of radial movement, the retaining member being configured to interact with the annular slide block and the coupling sleeve; wherein in an unmated state, the first biasing member forces the annular slide block to engage the retaining member, and the coupling sleeve is in a first position relative to the connection mechanism body; and wherein in a mated state, a proximal portion of a second optical fiber connector that can mate with the optical fiber connector forces the annular slide block away from the retaining member, and the second biasing member forces the coupling sleeve against the retaining member and forces the coupling sleeve to be in a second position relative to the connection mechanism body, and the second position is closer to the proximal end of the optical fiber connector than the first position.

According to an embodiment of the present disclosure, the retaining member may be a ball.

According to an embodiment of the present disclosure, the first biasing member and/or the second biasing member may be a spring(s).

According to an embodiment of the present disclosure, the annular slide block may include a recess, and the retaining member resides in the recess in the unmated state.

According to an embodiment of the present disclosure, the proximal portion of the second optical fiber connector may include an annular groove, and the retaining member is pressed in the annular groove in the mated state.

According to an embodiment of the present disclosure, the optical fiber connector may be provided with a first indicative mark, which may be configured to enable the elongate member of the optical fiber connector to be aligned with an elongate member of a second optical fiber connector that can mate with the optical fiber connector when the indicative mark is aligned with a corresponding second indicative mark on the second optical fiber connector.

According to an embodiment of the present disclosure, the first indicative mark of the optical fiber connector may be disposed on an outer peripheral surface of a proximal portion of the connector body.

According to an embodiment of the present disclosure, the first indicative mark of the optical fiber connector may be configured as a slot and/or a colored portion.

According to an embodiment of the present disclosure, a proximal portion of the connector body of the optical fiber connector may be provided with at least one guide feature, and the guide feature of the optical fiber connector may be mated with at least one mating guide feature disposed at a proximal portion of a mating optical fiber connector, so as to facilitate connection of the optical fiber connector with the mating optical fiber connector and to prevent the optical fiber connector and the mating optical fiber connector from rotating with respect to each other.

According to an embodiment of the present disclosure, the guide feature of the optical fiber connector may be configured as a protrusion on an outer peripheral surface of the connector body, and the mating guide feature of the mating optical fiber connector may be configured as a slot capable of accommodating the protrusion.

According to an embodiment of the present disclosure, the guide feature of the optical fiber connector may be configured as a plunger having a hemispherical head, and the plunger may be placed in a hole disposed at the proximal end of the connector body with the hemispherical head of the plunger protruding from the outer peripheral surface of the connector body.

According to an embodiment of the present disclosure, the elongate member of the optical fiber connector may be LC-type optical fiber connection element.

According to an embodiment of the present disclosure, the elongate member of the optical fiber connector may be SC-type optical fiber connection element.

According to a second aspect of the present disclosure, an optical fiber connector assembly is provided. The optical fiber connector assembly may include a first optical fiber connector and a second optical fiber connector. The first optical fiber connector may comprise: a cylindrical first connector body; a first optical fiber connection assembly disposed within the first connector body proximate to a proximal end of the first connector body, the first optical fiber connection assembly including a first support and at least one first elongate member fixed to and extending through the first support, the first elongate member being configured to couple an optical fiber in a first optical fiber cable; a locking assembly for holding the first optical fiber cable, the locking assembly being disposed proximate to a distal end of the first optical fiber connection assembly; and a sealing element disposed at a distal end of the first optical fiber connector, the sealing element being configured to seal a connection between the distal end of the first optical fiber connector and an outer periphery of the first optical fiber cable. The second optical fiber connector may comprise: a cylindrical second connector body; and a second optical fiber connection assembly disposed within the second connector body proximate to a proximal end of the second connector body, the second optical fiber connection assembly including a second support and at least one second elongate member fixed to and extending through the second support. The first elongate member and the second elongate member are configured to be of the same type and number, and are aligned with each other when the first optical fiber connector and the second optical fiber connector are connected together.

According to an embodiment of the present disclosure, the first optical fiber connector and the second optical fiber connector may be provided with a first indicative mark and a second indicative mark respectively, and the first indicative mark and the second indicative mark may be configured to ensure that the first elongate member of the first optical fiber connector can be aligned with the second elongate member of the second optical fiber connector when the two indicative marks are aligned.

According to an embodiment of the present disclosure, the first indicative mark of the first optical fiber connector may be disposed on an outer peripheral surface of a proximal portion of the first connector body, and the second indicative mark of the second optical fiber connector may be disposed on an outer peripheral surface of a proximal portion of the second connector body.

According to an embodiment of the present disclosure, the first indicative mark of the first optical fiber connector may be configured as a slot and/or a colored portion.

According to an embodiment of the present disclosure, the second indicative mark of the second optical fiber connector may be configured as a slot and/or a colored portion.

According to an embodiment of the present disclosure, the first optical fiber connector and the second optical fiber connector may be provided with at least one first guide feature and at least one second guide feature respectively, and the first guide feature is mated with the second guide feature to facilitate connection of the first optical fiber connector and the second optical fiber connector and to prevent the first optical fiber connector and the second optical fiber connector from rotating with respect to each other.

According to an embodiment of the present disclosure, the first guide feature may be configured as a protrusion on an outer peripheral surface of the first connector body, and the second guide feature may be configured as a slot in an inner peripheral surface of the second connector body, the slot capable of accommodating the protrusion.

According to an embodiment of the present disclosure, the first guide feature may be configured as a plunger having a hemispherical head, and the plunger may be placed in a hole disposed at the proximal end of the first connector body with the hemispherical head of the plunger protruding from the outer peripheral surface of the first connector body.

According to an embodiment of the present disclosure, the optical fiber connector assembly may also include a push-pull connection mechanism disposed on the first optical fiber connector. The push-pull connection mechanism may include: a cylindrical connection mechanism body arranged coaxially with the first connector body and radially spaced apart from the outer surface of the first connector body by a distance to form an annular gap between the connection mechanism body and the first connector body; a coupling sleeve at least partially covering the connection mechanism body; an annular slide block positioned in the annular gap; a first biasing member biasing the annular slide block toward the proximal end of the first optical fiber connector; a second biasing member biasing the coupling sleeve toward the proximal end of the first optical fiber connector; at least one retaining member, each of which being respectively positioned in a respective pocket of the connection mechanism body and being capable of radial movement, the retaining member being configured to interact with the annular slide block and the coupling sleeve; wherein in an unmated state, the first biasing member forces the annular slide block to engage the retaining member, and the coupling sleeve is in a first position relative to the connection mechanism body; and wherein in a mated state, the proximal end of the second connector body of the second optical fiber connector forces the annular slide block away from the retaining member, and the second biasing member forces the coupling sleeve against the retaining member and forces the coupling sleeve to be in a second position relative to the connection mechanism body, and the second position is closer to the proximal end of the first optical fiber connector than the first position.

According to an embodiment of the present disclosure, the retaining member may be a ball.

According to an embodiment of the present disclosure, the first biasing member and/or the second biasing member may be a spring(s).

According to an embodiment of the present disclosure, the annular slide block may include a recess, and the retaining member resides in the recess in the unmated state.

According to an embodiment of the present disclosure, a proximal portion of the second connector body of the second optical fiber connector may include an annular groove, and the retaining member is pressed in the annular groove in the mated state.

According to an embodiment of the present disclosure, the sealing element may comprise a cylindrical sealing element body and a flange disposed at a proximal end of the sealing element body, wherein the sealing element body is configured to seal the outer periphery of the first optical fiber cable, and the flange is configured to seal the distal end of the first optical fiber connector.

According to an embodiment of the present disclosure, the locking assembly may include a first locking mechanism for crimping at least a jacket of the first optical fiber cable and a second locking mechanism for gripping the first optical fiber cable.

According to an embodiment of the present disclosure, the first locking mechanism may include a support member and a crimping member. The support member is configured to support at least the jacket of the first optical fiber cable on an outer periphery of the support member, and the crimping member is configured to crimp the jacket of the first optical fiber cable between the support member and the crimping member.

According to an embodiment of the present disclosure, the second locking mechanism may include a gripping member and a tightening member for tightening the gripping member. The gripping member may include a gripping portion formed of a plurality of resilient fingers distributed along a circumferential direction, and the plurality of resilient fingers are capable of being deformed radially inwardly by the tightening member so as to grip the first optical fiber cable extending therethrough.

According to an embodiment of the present disclosure, the second optical fiber connector may include a mounting panel in the shape of a square or a rectangle.

According to an embodiment of the present disclosure, the first elongate member and the second elongate member may both be configured as LC-type optical fiber connection elements.

According to an embodiment of the present disclosure, the first elongate member and the second elongate member may both be configured as SC-type optical fiber connection elements.

BRIEF DESCRIPTION OF THE DRAWINGS

Features and advantages present invention will become more apparent with reference to the following detailed description of specific embodiments of the present disclosure in conjunction with the drawings, wherein:

FIG. 2 is a schematic exploded perspective view of the male optical fiber connector of FIG. 1, with some parts omitted for clarity.

FIG. 3 is a schematic exploded cross-sectional view of the male optical fiber connector of FIG. 2.

DETAILED DESCRIPTION

The present disclosure will be described below with reference to the drawings, in which several embodiments of the present disclosure are shown. It should be understood, however, that the present disclosure may be presented in various different ways, not limited to the embodiments described below. In fact, the embodiments described hereinafter are intended to make a more complete disclosure of the present invention and to adequately explain the scope of the present invention to a person skilled in the art. It should also be understood that, the embodiments disclosed herein can be combined in various ways to provide many additional embodiments.

It should be understood that the wordings in the specification are only used for describing particular embodiments and are not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail. The singular forms "a/an" and "the" as used in the specification, unless clearly indicated, all contain the plural forms. The wordings "comprising", "containing" and "including" used in the specification indicate the presence of the claimed features, but do not preclude the presence of one or more additional features.

In the specification, when an element is referred to as being "attached", "connected", or "coupled" to another element, it can be directly attached, connected or coupled to the other element or intervening elements may also be present. In contrast, when an element is referred to as being "directly attached", "directly connected" and "directly coupled" to another element, there are no intervening elements present.

In the specification, a "proximal end" (shown as "P" in the figure) of a connector refers to an end of the connector that mates with another connector or another connection interface, and a "distal end" (shown as "D" in the figure) of the connector refers to an end opposite to the "proximal end".

Figure 1:
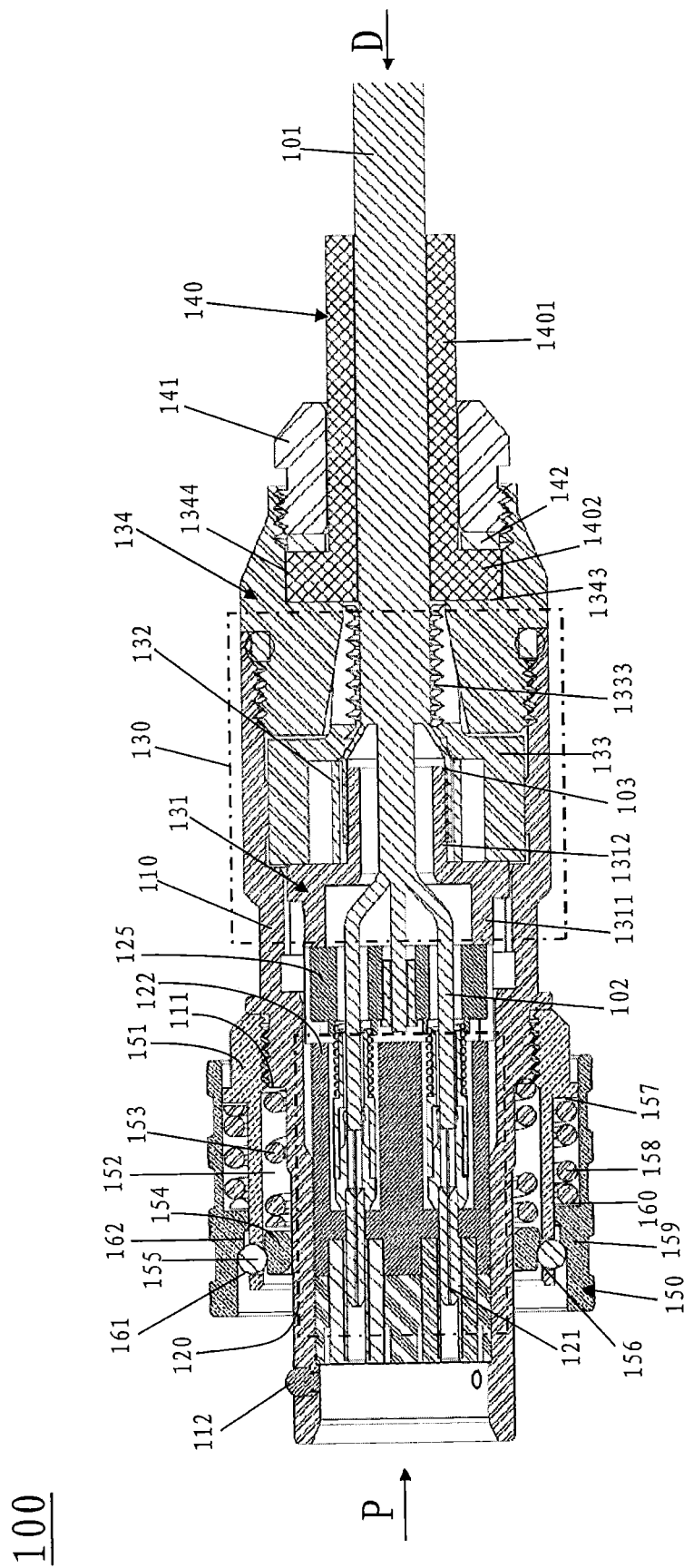
FIG. 1 is a schematic cross-sectional view of a male optical fiber connector according to an embodiment of the present disclosure.

Referring to FIGS. 1-3, a first connector 100 may be configured as a straight tip optical fiber cable connector (also called a "male optical fiber connector" in the present disclosure) for the connection of a cable 101. The cable 101 may be one of many commonly used optical fiber cables, including a fiber optic distribution cable or a hybrid optical cable. According to embodiments of the present disclosure, the cable 101 may include one or more optical fibers 102, Kevlar fibers surrounding the optical fibers 102 and/or filled in between the optical fibers 102, and a jacket surrounding the optical fibers 102 and the Kevlar fibers. In FIGS. 1-3, the Kevlar fibers and the jacket are shown together and indicated by a numeral reference 103.

The first connector 100 may include: a connector body 110; an optical fiber connection assembly 120 disposed within the connector body 110 proximate to a proximal end of the connector body 110; a locking assembly 130 for holding the optical fiber cable 101 in place, the locking assembly being located proximate to a distal end of the optical fiber connection assembly; and a sealing element 140 disposed at a distal end of the first connector 100, the sealing element being configured to seal the connection between the distal end of the first connector 100 and an outer periphery of the cable 101.

The connector body 110 may have a generally cylindrical shape. The connector body 110 may be made of a metal material such as stainless steel or brass.

The optical fiber connection assembly 120 may include one or more elongate members 121. A proximal end of each elongate member 121 may include a ceramic ferrule. A distal end of each elongate member 121 may be provided with a cavity for receiving, for example, an optical fiber, so as to achieve connection with the optical fiber. According to some embodiments, the elongate members may be LC-type optical fiber connection elements, including a ceramic ferrule with a diameter substantially equal to 1.25 mm. In other embodiments, the elongate members may be SC-type optical fiber connection elements, including a ceramic ferrule with a diameter substantially equal to 2.5 mm.

Each elongate member 121 may be affixed to and extend through a support 122 (see FIG. 1). The support 122 may be configured in the form of a sleeve. According to embodiments of the present disclosure, the support 122 may be made of zirconium oxide or steel.

In the embodiment shown in FIG. 1, the optical fiber connection assembly 120 includes two elongate members 121, each of which is shown as LC type optical fiber connection element. Of course, as described above, each of the elongate members 121 may also be configured to SC type optical fiber connection element, or any other suitable type optical fiber connection element. Additionally, although not shown, the optical fiber connection assembly 120 may also include three or more elongate members 121. In the case where the optical fiber connection assembly 120 includes a plurality of elongate members 121, the use of LC-type optical fiber connection elements may reduce the size of the optical fiber connection assembly 120.

Next, the locking assembly 130 will be described, which is configured to fix the cable 101. When the cable 101 is connected to the first connector 100, the locking assembly 130 may prevent optical fibers 102 of the cable 101 from being disconnected from the elongate members 121 due to the cable 101 being pulled by an external force, and the locking assembly 130 may also protect optical fibers 102 of the cable 101 from being damaged due to shaking or swinging of the cable 101.

According to embodiments of the present disclosure, the locking assembly 130 includes a first locking mechanism for crimping at least the jacket (preferably, the Kevlar fibers and the jacket 103) of the cable 101 and a second locking mechanism for clamping the cable 101 itself, wherein the first locking mechanism may prevent at least the jacket (preferably, the Kevlar fibers and the jacket 103) from being detached from the optical fibers by an external force, and the second locking mechanism may prevent optical fibers from being disconnected from the elongate members 121 due to the optical fiber cable being pulled by an external force and may prevent the optical fibers from being damaged due to shaking or swinging of the cable 101.

The first locking mechanism includes a support member 131 and a crimping member 132. The outside surface of the support member 131 is adapted to engage at least the jacket or both the Kevlar fibers and the jacket 103 of the cable 101, and the crimping member 132 is adapted to cooperate with the support member 131 to crimp the jacket or both the Kevlar fibers and the jacket 103 therebetween. Specifically, in the embodiment shown in FIGS. 1-3, the support member 131 includes a first cylindrical portion 1311 with a larger diameter and a second cylindrical portion 1312 with a smaller diameter. The optical fiber 102 extends through the first cylindrical portion 1311 and the second cylindrical portion 1312, and the jacket or both the Kevlar fibers and the jacket 103 engage the outside surface of the second cylindrical portion 1312. The crimping member 132 may be a crimping sleeve, which may be adapted to fit over the outside surface of the second cylindrical portion 1312 of the support member 131 and the diameter of which may be reduced by crimping so as to clamp the jacket or both of the Kevlar fibers and the jacket 103 between the support member 131 and the crimping member 132.

The second locking mechanism includes a gripping member 133 and a tightening member 134 for tightening the gripping member 133. The cable 101 extends through the gripping member 133 and the tightening member 134. The gripping member 133 includes a gripping portion 1332 formed of a plurality of resilient fingers 1331 (see FIGS. 2 and 3). The plurality of resilient fingers 1331 are disposed spaced apart from each other in a circumferential direction. The gripping portion 1332 may be tapered, with a diameter gradually decreasing from its proximal end toward its distal end. Correspondingly, a proximal end of the tightening member 134 is provided with a lumen 1341 for receiving the gripping portion 1332 of the gripping member 133 (see FIG. 3). The lumen 1341 has a tapered shape with a diameter gradually decreasing from its proximal end toward its distal end. In this way, when the gripping portion 1332 of the gripping member 133 is inserted into the lumen 1341 of the tightening member 134, as the diameter of the lumen 1341 gradually decreases, the plurality of resilient fingers 1331 are deformed radially inwardly by a radially inward compressive force and are thus gradually converged, and the plurality of resilient fingers 1331 can thus grip the cable 101 extending therethrough.

The resilient fingers 1331 may be provided with protrusions 1333 on inner surfaces thereof. The protrusions 1333 may allow the resilient fingers 1331 to grip the cable 101 more firmly. According to embodiments of the present disclosure, the protrusions 1333 may be configured in the form of teeth, such as thread teeth. However, the present disclosure is not limited thereto, and the resilient fingers 1331 may be provided with any other form of protrusions on the inner surfaces thereof, such as ribs, ridges, and the like. The protrusions 1333 may be continuous protrusions or may be discontinuous or discrete protrusions.

According to embodiments of the present disclosure, the tightening member 134 is configured to be connectable with the connector body 110 in a threaded connection. Specifically, a distal portion of the connector body 110 is provided with internal threads and a proximal portion of the tightening member 134 is provided with external threads, so that the tightening member 134 may be screwed into the distal portion of the connector body 110. During the threaded-connection process of the tightening member 134 and the connector body 110, the gripping portion 1332 of the gripping member 133 gradually goes deep into the tapered lumen 1341 of the tightening member 134, resulting in the resilient fingers 1331 of the gripping portion 1332 gradually deforming radially inwardly to grip the cable 101.

Further, in order to achieve sealing of the connection interface between the tightening member 134 and the connector body 110, a seal 1342 may be provided on the outer periphery of the tightening member 134. The seal 1342 may be housed in an annular groove provided in the outer periphery of the tightening member 134. When the tightening member 134 is screwed onto the connector body 110, the seal 1342 is pressed between the tightening member 134 and the connector body 110, thereby achieving sealing of the connection interface therebetween. According to embodiments of the present disclosure, the seal 1342 may be an O-ring. However, the present disclosure is not limited thereto, and other forms of seals may be used, such as seals having a rectangular cross section.

As described above, a sealing element 140 is also provided at the distal end of the first connector 100. The sealing element 140 is configured to form sealing at the distal end of the first connector 100 and on the outer periphery of the cable 101, so as to prevent water, moisture, dust, and the like from entering the interior of the first connector 100 from the distal end of the first connector 100 or along the outer peripheral surface of the cable 101. According to embodiments of the present disclosure, the sealing element 140 includes a cylindrical body 1401 and a flange 1402 disposed at a proximal end of the cylindrical body 1401. The cylindrical body 1401 may be tightly fitted over the outer periphery of the cable 101, and may have a length large enough to prevent water, moisture, dust, and the like from entering the interior of the first connector 100 along the outer peripheral surface of the cable 101. The flange 1402 is configured to seal the distal end of the first connector 100. According to embodiments of the present disclosure, the tightening member 134 is provided at a distal portion thereof with a second lumen for receiving the flange 1402 of the sealing element 140. The flange 1402 of the sealing element 140 extends into the second lumen of the tightening member 134, with an end surface and an outer surface of the flange 1402 abutting an end surface 1343 and an inner surface 1344 of the second lumen of the tightening member 134, respectively, thereby forming sealing at both the end surface 1343 and the inner surface 1344 of the second lumen.

An end plug 141 may be used to clamp the flange 1402 of the sealing element 140 between the tightening member 134 and the end plug 141. As shown more clearly in FIGS. 1 and 3, the end plug 141 may also extend into the second lumen of the tightening member 134 and be threadedly connected to the tightening member 134. The flange 1402 of the sealing element 140 may be compressed to various degrees based on extents that the end plug 141 extends into the second lumen of the tightening member 134, so as to achieve the desired sealing effect. A gasket 142 may also be disposed between the flange 1402 of the sealing element 140 and the end plug 141. The gasket 142 can, on one hand, protect the sealing element 140, and on the other hand, adjust the compression degree to the flange 1402 of the sealing element 140 by the end plug 141 via selecting the thickness of the gasket 142.

The sealing element 140 may be made of silicon rubber. The sealing element 140 may be shaped differently as required.

In embodiments where the optical fiber connection assembly 120 includes a plurality of elongate members 121, each optical fiber connection elements 121 may couple one optical fiber 102. In order to effectively separate the optical fibers 102 from each other, a separation element 125 may be disposed between the optical fiber connection assembly 120 and the locking assembly 130. The separation element 125 may be configured in the shape of a cylinder with through holes therein for allowing the optical fibers 102 to pass through (see FIGS. 1 and 3). Allowing different optical fibers 102 to pass through different through holes to separate the optical fibers from each other may facilitate the coupling of the optical fibers 102 with the elongate members 121.

The basic structure of the first connector 100 according to embodiments of the present disclosure has been described above. By disposing the optical fiber connection assembly 120 within the connector body 110 and by sealing the interface between the distal end of the first connector 100 and the outer surface of the cable 101 via the sealing element 140, water, moisture, dust and the like may be prevented from entering the interior of the first connector 100, which may enable the first connector 100 to be used outdoors.

In the first connector 100, rotation of any part within the connector body 110 is unexpected. As the optical fibers 102 are very fragile, rotation of parts within the connector body 110 may cause rotation of the cable 101, which may result in damage to the optical fibers 102. In order to prevent some parts from rotating within the connector body 110, the outer periphery of each part is configured in a polygonal structure. Correspondingly, the inner surface of the connector body 110 is also configured to have a corresponding polygonal structure. In this way, when each part is assembled within the connector body 110, the rotation of the part with respect to the connector body 110 can be effectively prevented. For example, in the embodiment shown in FIG. 2, at least a portion of the outer periphery of the support member 131 is configured in a hexagonal configuration. Likewise, at least a portion of the outer periphery of the gripping member 133 is also configured in a hexagonal configuration. Of course, the present disclosure is not limited thereto, and the outer periphery of each part may be configured in other polygonal structures such as a quadrangular structure, a pentagonal structure, or the like.

With continued reference to FIG. 2, in order to facilitate the assembly, a corresponding alignment feature may also be provided on each part of the first connector 100. For example, two guide slots 1314 spaced apart by 180° may be disposed on the first cylindrical portion 1311 of the support member 131, and two guide posts 1334 spaced apart by 180° may be disposed on the gripping member 133. During assembly, the guide posts 1334 can be inserted into the guide slots 1314 to achieve alignment of the support member 131 with the gripping member 133 and to thereby facilitate the assembly.

Figure 4:
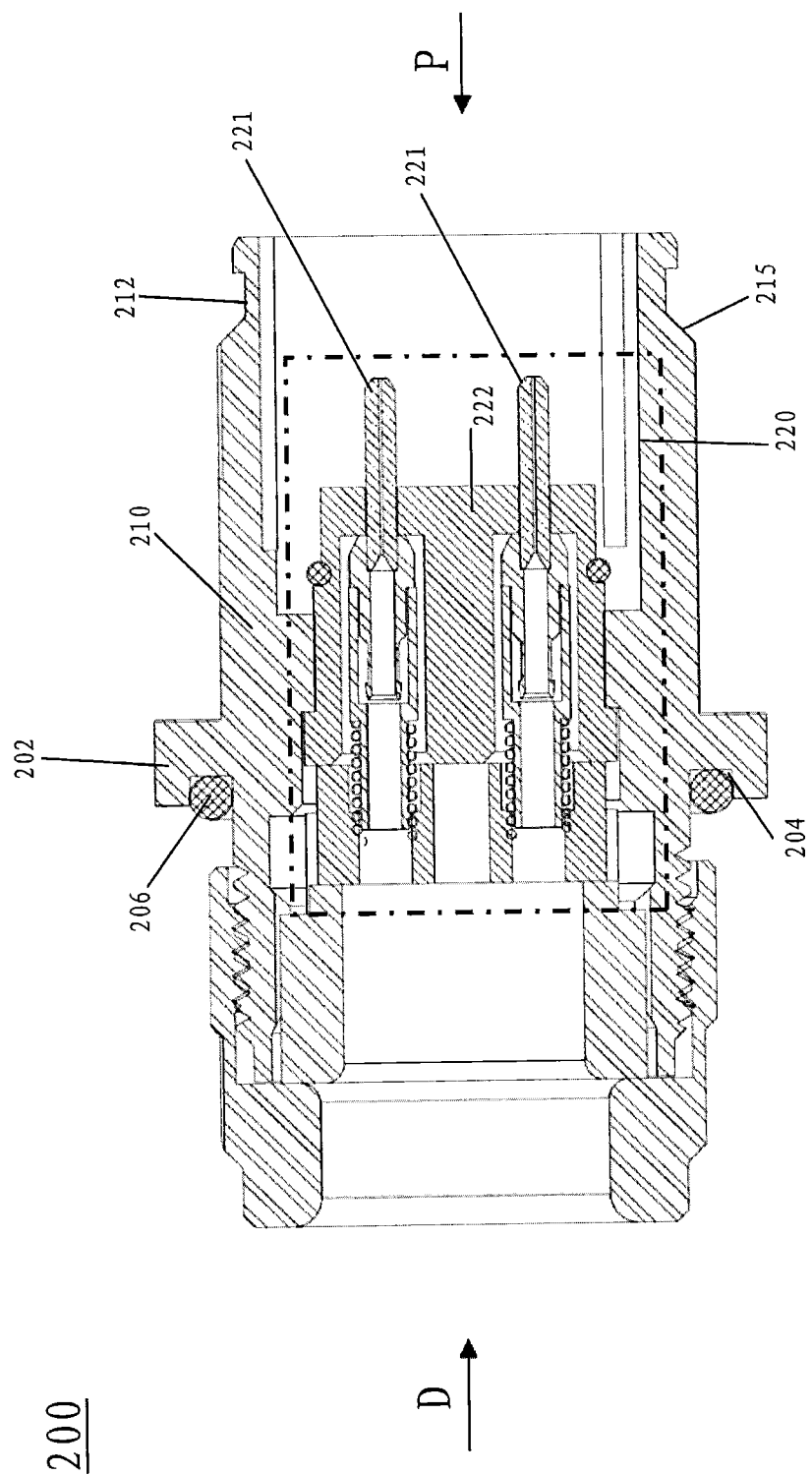
FIG. 4 is a schematic cross-sectional view of a female optical fiber connector according to an embodiment of the present disclosure.

Referring next to FIG. 4, a schematic cross-sectional view of a second connector 200 that can be connected with the first connector 100 is shown. The second connector 200 may be configured as a panel-mounted connector (also called a "female optical fiber connector" in the present disclosure) that includes a mounting panel 202 in the shape of a square or rectangle. The mounting panel 202 may be used to affix the second connector 200 to other devices or components, such as a cover plate of a base station antenna. A groove 204 for receiving a seal may be provided in a back surface of the mounting panel 202. When the mounting panel 202 is to be affixed to other devices or components, a seal such as an O-ring 206 is placed in the groove 204 of the mounting panel 202 for sealing. Fasteners such as screws may be used to affix the mounting panel 202 to the other devices or components.

Like the first connector 100, the second connector 200 includes a generally cylindrical connector body 210 and an optical fiber connection assembly 220 disposed within the connector body 210. The optical fiber connection assembly 220 may include one or more elongate members 221. Like the elongate member 121, a proximal end of the elongate member 221 may include a ceramic ferrule, whereas a distal end of the elongate member 221 may be provided with a cavity for receiving, for example, an optical fiber. Likewise, the elongate members 221 may also be configured as standard optical fiber connectors, including SC-type or LC-type optical fiber connectors.

The elongate member 221 may be fixedly mounted onto and extend through a support 222. The support 222 may be configured in the form of a sleeve. The support 222 may be made of zirconium oxide or steel.

The second connector 200 may be mated with the first connector 100. When mated, the ceramic ferrule of the elongate member 221 of the second connector 200 is aligned with and generally abuts the ceramic ferrule of the elongate member 121 of the first connector 100 to facilitate the transmission of signals.

According to actual requirements, the distal end of the second connector 200 may be directly coupled to an optical fiber or other suitable cables. However, it should be noted that the second connector 200 may also, like the first connector 100, include a locking assembly for holding an optical fiber cable and a sealing element located at the distal end of the connector body. In other words, the second connector 200 may be configured to have an internal structure and a distal structure that are substantially similar to those of the first connector 100, except for the interface portion and the proximal connection mechanism portion.

Next, the connection between the first connector 100 and second connector 200 will be described. According to embodiments of the present disclosure, a push-pull connection mechanism may be used to connect the first connector 100 and second connector 200. FIG. 1 shows a push-pull connection mechanism 150 included in the first connector 100.

As shown in FIG. 1, the push-pull connection mechanism 150 includes a cylindrical connection mechanism body 151 that can be connected to the connector body 110 by means of threaded connection or the like. The connection mechanism body 151 may be arranged coaxially with the connector body 110 and is radially spaced from the outer surface of the connector body 110 by a distance, so that an annular gap 152 is formed between the inner surface of the connection mechanism body 151 and the outer surface of the connector body 110. The annular gap 152 may be formed by providing a shoulder 111 on the outer periphery of the connector body 110. An inner spring 153 is located in the annular gap 152. One end of the inner spring 153 abuts the shoulder 111, and the other end abuts an annular slide block 154 arranged within the annular gap 152. Four retaining members 155 are positioned in pockets disposed at the proximal end of the connection mechanism body 151. The retaining members 155 may be configured as balls. The annular slide block 154 has a recess 156 in its outer surface, and the recess 156 contacts the retaining members 155.

A shoulder 157 is provided on the outer surface of the connection mechanism body 151 proximate to the distal end of the connection mechanism body 151. An outer spring 158 surrounds the outer surface of the connection mechanism body 151. A coupling sleeve 159 is provided outside the outer spring 158. The coupling sleeve 159 at least partially covers the connection mechanism body 151. The inner surface of the coupling sleeve 159 is provided with a shoulder 160 that is proximate to the proximal end of the coupling sleeve 159. An annular cavity for receiving the outer spring 158 is formed between the shoulder 157 and the shoulder 160. One end of the outer spring 158 abuts the shoulder 157 and the other end abuts the shoulder 160.

A first annular undercut 161 and a second annular undercut 162 are provided on the inner surface of the proximal end of the coupling sleeve 159. The first annular undercut 161 and the second annular undercut 162 are configured to receive the retaining members 155. The diameter of the first annular undercut 161 is greater than the diameter of the second annular undercut 162. An inclined transition is provided between the first annular undercut 161 and the second undercut 162.

In the unmated state, the coupling sleeve 159 is in a first position relative to the connection mechanism body 151, such that the retaining members 155 are received in the first annular undercut 161 of the coupling sleeve 159. In this first position, the outer spring 158 is compressed between the shoulder 157 of the connection mechanism body 151 and the shoulder 160 of the coupling sleeve 159. The inner spring 153 applies a slight biasing force on the slide block 154, such that the retaining members 155 are received in the recess 156 of the slide block 154.

When the first connector 100 is mating with another connector or connection interface (for example, the second connector 200), at least a portion of the proximal end of the connector body 210 of the second connector 200 enters the annular gap 152 of the first connector 100, contacts the slide block 154, and forces the slide block 154 to move toward a direction compressing the inner spring 153 and away from the retaining members 155. When the slide block 154 moves away from the retaining members 155, the retaining members 155 can move radially inwardly. In this process, the coupling sleeve 159 is also moved toward the proximal end relative to the connection mechanism body 151 by the push of the outer spring 158, so as to force the retaining members 155 to move radially inwardly by means of the inclined transition between the first annular undercut 161 and the second annular undercut 162, until the retaining members 155 are received in the annular groove 212 disposed proximate to the proximal end of the connector body 210 of the optical fiber connector 200 (see FIG. 0.4) and in the second annular undercut 162 of the coupling sleeve 159. At this time, the coupling sleeve 159 is moved to a second position, and the retaining members 155 are pressed between the annular groove 212 of the optical fiber connector 200 and the second annular undercut 162 of the coupling sleeve 159 so as to form a firm connection between the first and the second connectors 100 and 200.

In order to disconnect the first connector 100 from the second connector 200, the coupling sleeve 159 and the first connector 100 are pulled in a direction toward the distal end, the coupling sleeve 159 is pulled from the second position to the first position, such that the first annular undercut 161 of the coupling sleeve 159 is moved to the position where the retaining members 155 are located. At this point, the retaining members 155 are free to move radially outwardly. The coupling sleeve 159 and the optical fiber connector 100 continue to be pulled such that the retaining members 155 are moved out of the annular groove 212 along the inclined surface 215 of the annular groove 212 (see FIG. 4). At the same time, the slide block 154 is moved toward the proximal end by the push of the inner spring 153 and finally moved to the position where the retaining members 155 are located, such that the retaining members 155 are received in the recess 156 of the slide block 154. At this time, the connection mechanism 150 returns to the initial unmated state, and the first connector 100 is disconnected from the second connector 200.

The connection mechanism 150 achieves the connection of the first connector 100 and second connector 200 by a "push-pull" action. This way is simpler and quicker than traditional threaded connection.

Those skilled in this art will appreciate that other connection mechanisms, such as those shown in U.S. Pat. Nos. 6,702,289; 6,692,286; 8,496,495; and 6,645,011, the disclosures of which are hereby incorporated herein by reference in full, may be suitable for use with the connectors discussed herein.

Figure 5:
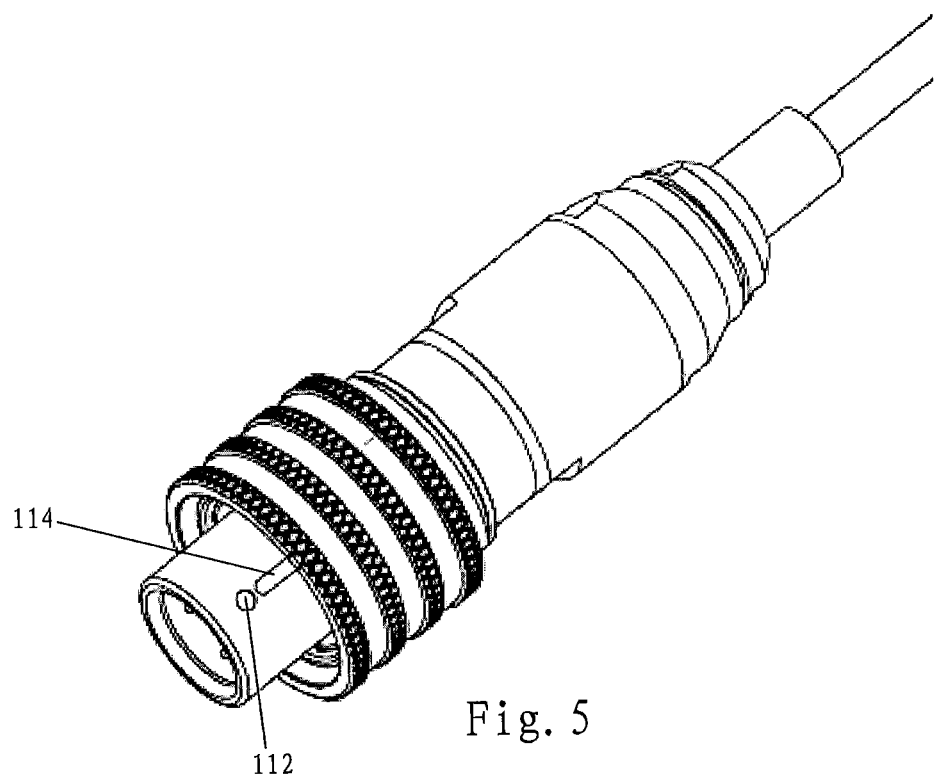
FIG. 5 and FIG. 6 are perspective views of a male optical fiber connector and a female optical fiber connector, respectively, according to an embodiment of the present disclosure in which indicative marks and guide features provided on the male optical fiber connector and the female optical fiber connector are shown.
Figure 6:
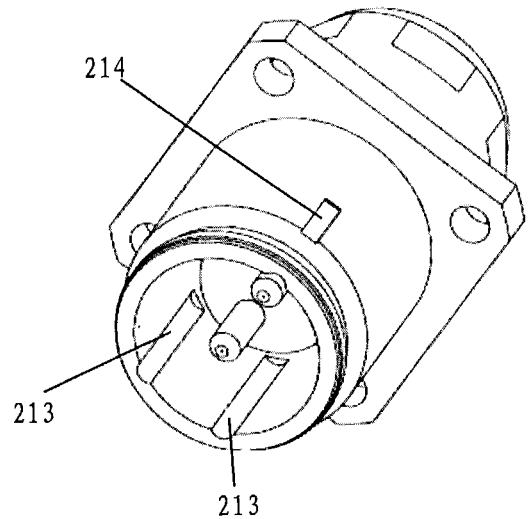

In the case where the first connector 100 and second connector 200 each include two or more elongate members 121, 221, in order to align the elongate members 121 of the connector 100 with the elongate members 221 of the connector 200, indicative marks may be provided on the first and second connectors 100 and 200. As shown in FIGS. 5 and 6, indicative marks 114 and 214 are provided on the outer peripheral surfaces of the proximal portions of the connector bodies 110 and 210 of the first connector 100 and second connector 200, respectively. The indicative marks 114 and 214 are configured to enable alignment of the elongate members 121 and 221 by alignment of the indicative marks 114 and 214. The indicative marks 114 and 214 may be configured as slots, or may be configured as colored portions (such as red, yellow, etc.) so far as they are readily visible to operators.

Further, in order to facilitate the connection of the first connector 100 and second connector 200 and prevent the first connector 100 and second connector 200 from rotating with respect to each other, at least one guide feature 112 may also be provided proximate to the proximal end of the connector body 110 of the optical fiber connector 100. The guide feature 112 may be configured as a protrusion. As shown more clearly in FIG. 1, the guide feature 112 may be configured as a plunger having a hemispherical head. The plunger is placed in a hole provided proximate to the proximal end of the connector body 110, and the hemispherical head of the plunger protrudes from the outer peripheral surface of the connector body 110. Correspondingly, as shown in FIG. 6, at least one mating guide feature 213 is provided at the proximal portion of the connector body 210 of the optical fiber connector 200. The mating guide feature 213 may be configured as a slot in the inner surface of the connector body 210. The slot extends a certain length along the axial direction of the connector body 210. Upon connecting the first connector 100 and second connector 200, the guide feature 112 configured as the plunger having a hemispherical head may be accommodated in the mating guide feature 213 configured as the slot so as to facilitate connection and mating of the first connector 100 and second connector 200 and to prevent the first connector 100 and second connector 200 from rotating with respect to each other.

According to embodiments of the present disclosure, three guide features 112 are provided, which are evenly distributed on the connector body 110 in a circumferential direction. Likewise, three mating guide features 213 are provided, which are evenly distributed on the connector body 210 in a circumferential direction. However, other numbers of guide features 112 and mating guide features 213 may be provided depending on the actual condition. Further, the guide feature 112 and the mating guide feature 213 may also have other suitable forms.

Figure 7:
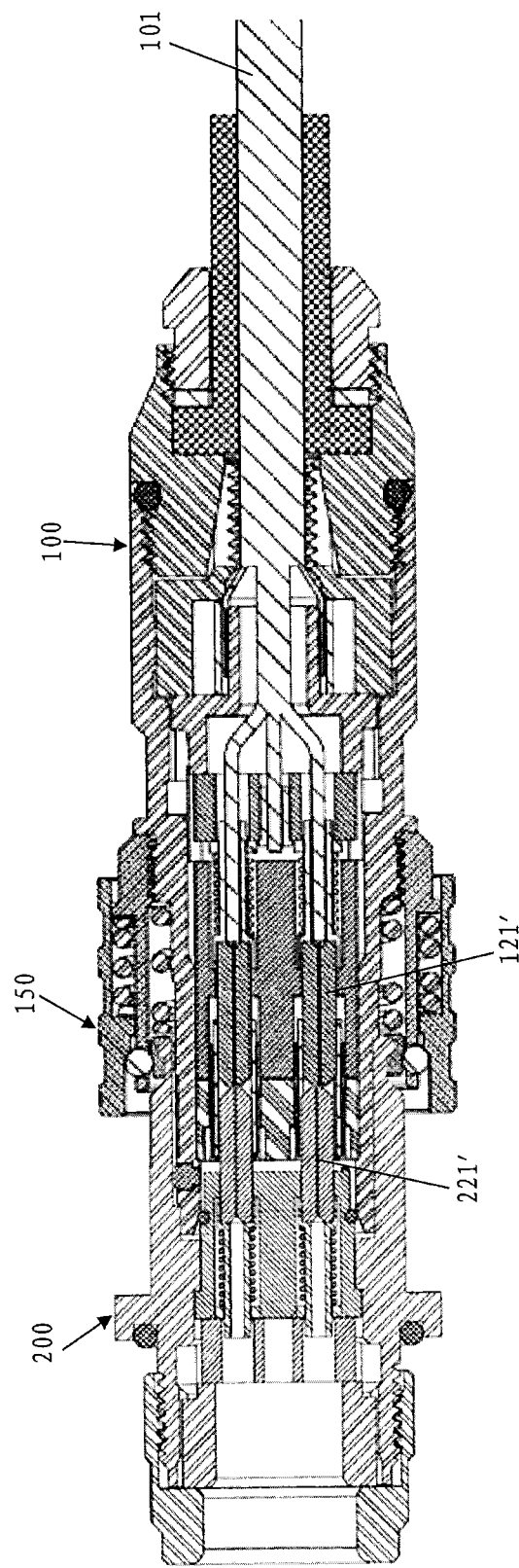
FIG. 7 is a schematic cross-sectional view which illustrates a male optical fiber connector and a female optical fiber connector in a connected position according to an embodiment of the present disclosure.

FIG. 7 is a schematic cross-sectional view which illustrates the first connector 100 and second connector 200 in a mated position. In FIG. 7, the elongate members 121' and 221' of the first connector 100 and second connector 200 are shown as SC-type optical fiber connection elements 121' and 221', respectively. As can be seen from FIG. 7, when the first connector 100 and second connector 200 are connected together, the ceramic ferrule of the elongate member 121' of the first connector 100 is aligned with and generally abuts the ceramic ferrule of the elongate member 221' of the second connector 200 so as to allow transmission of signals.

Although exemplary embodiments of this disclosure have been described, those skilled in the art should appreciate that many variations and modifications are possible in the exemplary embodiments without departing from the spirit and scope of the present disclosure. Accordingly, all such variations and modifications are intended to be included within the scope of this disclosure as defined in the claims.

What is claimed is:

1. An optical fiber connector, comprising:
a cylindrical connector body;
an optical fiber connection assembly disposed within the connector body proximate to a proximal end thereof the optical fiber connection assembly including a support and at least one elongate member fixed to and extending through the support, the elongate member being configured to engage an optical fiber in an optical fiber cable;
a locking assembly for holding the optical fiber cable, wherein the locking assembly is disposed proximate to a distal end of the optical fiber connection assembly; and
a sealing element disposed at a distal end of the optical fiber connector, wherein the sealing element is configured to seal a connection between the distal end of the optical fiber connector and an outer periphery of the optical fiber cable;
wherein the locking assembly includes a first locking mechanism for crimping at least a jacket of the optical fiber cable and a second locking mechanism for gripping the optical fiber cable itself; and
wherein the second locking mechanism includes a gripping member and a tightening member for tightening the griping member, the gripping member including a gripping portion formed of a plurality of resilient fingers distributed along a circumferential direction, and the plurality of resilient fingers capable of being deformed radially inwardly by the tightening member so as to gr the optical fiber cable extending therethrough.

2. The optical fiber connector according to claim 1, characterized in that the sealing element comprises a cylindrical sealing element body and a flange disposed at a proximal end of the sealing element body.

3. The optical fiber connector according to claim 1, characterized in that the first locking mechanism includes a support member and a crimping member, wherein an outside surface of the support member is configured to engage at least the jacket of the optical fiber cable, and the crimping member is configured to crimp the jacket between the support member and the crimping member.

4. The optical fiber connector according to claim 1, characterized in that inner surfaces of the resilient fingers include protrusions.

5. The optical fiber connector according to claim 1, characterized in that a proximal portion of the tightening member defines a lumen for receiving the gripping portion of the gripping member, and both the gripping portion of the gripping member and the lumen of the tightening member are tapered from a proximal end towards a distal end.

6. The optical fiber connector according to claim 5, characterized in that a distal portion of the tightening member defines a second lumen, and at least a portion of the sealing element extends into the second lumen.

7. The optical fiber connector according to claim 1, characterized in that the tightening member is connectable with the connector body in a threaded connection.

8. The optical fiber connector according to claim 7, characterized in that a second sealing element surrounds the tightening member for sealing a connection interface between the tightening member and the connector body.

9. The optical fiber connector according to claim 8, characterized in that the second sealing element is an O-ring.

10. The optical fiber connector according to claim 1, characterized in that the optical fiber connection assembly includes a plurality of elongate members and the optical fiber connector includes a separation element disposed between the optical fiber connection assembly and the locking assembly.

11. An optical fiber connector assembly, comprising:
a first optical fiber connector comprising:
a cylindrical first connector body;
a first optical fiber connection assembly disposed within the first connector body proximate to a proximal end of the first connector body, the first optical fiber connection assembly including a first support and at least one first elongate member affixed to and extending through the first support, the first elongate member being configured to couple an optical fiber in a first optical fiber cable;
a locking assembly for holding the first optical fiber cable, wherein the locking assembly is disposed proximate to a distal end of the first optical fiber connection assembly; and
a sealing element disposed at a distal end of the first optical fiber connector, wherein the sealing element is configured to seal a connection between the distal end of the optical fiber connector and an outer periphery of the first optical fiber cable;
a second optical fiber connector comprising:
a cylindrical second connector body; and
a second optical fiber connection assembly disposed within the second connector body proximate to a proximal end of the second connector body, the second optical fiber connection assembly including a second support and at least one second elongate member affixed to and extending through the second support;
wherein the first optical elongate member and the second elongate member are configured to be of the same type and number, and are aligned with each other when the first optical fiber connector and the second optical fiber connector are connected together;
wherein the first optical fiber connector and the second optical fiber connector are provided with a first indicative mark and a second indicative mark respectively, the first indicative mark and the second indicative mark being configured to ensure that the first elongate member of the first optical fiber connector can be aligned with the second elongate member of the second optical fiber connector when the two indicative marks are aligned.

12. The optical fiber connector assembly according to claim 11, characterized in that the first indicative mark of the first optical fiber connector is disposed on an outer peripheral surface of a proximal portion of the first connector body, and the second indicative mark of the second optical fiber connector is disposed on an outer peripheral surface of a proximal portion of the second connector body.

13. The optical fiber connector assembly according to claim 12, characterized in that the first indicative mark of the first optical fiber connector is configured as a slot and/or a colored portion.

14. The optical fiber connector assembly according to claim 11, characterized in that the second indicative mark of the second optical fiber connector is configured as a slot and/or a colored portion.

15. The optical fiber connector assembly according to claim 11, characterized in that the first optical fiber connector and the second optical fiber connector are provided with at least one first guide feature and at least one second guide feature respectively, the first guide feature being mated with the second guide feature to facilitate connection of the first optical fiber connector and the second optical fiber connector and to prevent the first optical fiber connector and the second optical fiber connector from rotating with respect to each other.

16. The optical fiber connector assembly according to claim 11, characterized in that the optical fiber connector assembly further comprises a push-pull connection mechanism disposed on the first optical fiber connector, the push-pull connection mechanism including:
 a cylindrical connection mechanism body arranged coaxially with the first connector body and radially spaced apart from the outer surface of the first connector body by a distance to form an annular gap between the connection mechanism body and the first connector body;
 a coupling sleeve at least partially covering the connection mechanism body;
 an annular slide block positioned in the annular gap;
 a first biasing member biasing the annular slide block toward the proximal end of the first optical fiber connector;
 a second biasing member biasing the coupling sleeve toward the proximal end of the first optical fiber connector;
 at least one retaining member, each of which being respectively positioned in a respective pocket of the connection mechanism body and being capable of radial movement, the retaining member being configured to interact with the annular slide block and the coupling sleeve;
 wherein in an unmated state, the first biasing member forces the annular slide block to engage the retaining member, and the coupling sleeve is in a first position relative to the connection mechanism body; and wherein in a mated state, the proximal end of the second connector body of the second optical fiber connector forces the annular slide block away from the retaining member, and the second biasing member forces the coupling sleeve against the retaining member and forces the coupling sleeve to be in a second position relative to the connection mechanism body, and the second position is closer to the proximal end of the first optical fiber connector than the first position.

17. An optical fiber connector, comprising:
 a cylindrical connector body;
 an optical fiber connection assembly disposed within the connector body proximate to a proximal end thereof the optical fiber connection assembly including a support and at least one elongate member fixed to and extending through the support, the elongate member being configured to engage an optical fiber in an optical fiber cable;
 a locking assembly for holding the optical fiber cable, wherein the locking assembly is disposed proximate to a distal end of the optical fiber connection assembly; and
 a sealing element disposed at a distal end of the optical fiber connector, wherein the sealing element is configured to seal a connection between the distal end of the optical fiber connector and an outer periphery of the optical fiber cable;
 wherein the optical fiber connector further comprises a push-pull connection mechanism including:
 a cylindrical connection mechanism body arranged coaxially with the connector body and radially spaced apart from an outer surface of the connector body by a distance to form an annular gap between the connection mechanism body and the connector body;
 a coupling sleeve at least partially covering the connection mechanism body;
 an annular slide block positioned in the annular gap;
 a first biasing member biasing the annular slide block toward the proximal end of the optical fiber connector;
 a second biasing member biasing the coupling sleeve toward the proximal end of the optical fiber connector;
 at least one retaining member, each of which being respectively positioned in a respective pocket of the connection mechanism body and being capable of radial movement, the retaining member being configured to interact with the annular slide block and the coupling sleeve;
 wherein in an unmated state, the first biasing member forces the annular slide block to engage the retaining member, and the coupling sleeve is in a first position relative to the connection mechanism body; and wherein in a mated state, a proximal portion of a second optical fiber connector that can mate with the optical fiber connector forces the annular slide block away from the retaining member, and the second biasing member forces the coupling sleeve against the retaining member and forces the coupling sleeve to be in a second position relative to the connection mechanism body, and the second position is closer to the proximal end of the optical fiber connector than the first position.

\* \* \* \* \*

UNITED STATES PATENT AND TRADEMARK OFFICE
CERTIFICATE OF CORRECTION

PATENT NO. : 11,495,913 B2
APPLICATION NO. : 16/916676
DATED : November 8, 2022
INVENTOR(S) : Liu et al.

It is certified that error appears in the above-identified patent and that said Letters Patent is hereby corrected as shown below:

In the Claims

Column 15, Line 31, Claim 1: Please correct "gr" to read --grip--

Signed and Sealed this
Fourteenth Day of March, 2023

*Katherine Kelly Vidal*
Katherine Kelly Vidal
*Director of the United States Patent and Trademark Office*